United States Patent

[11] 3,596,466

[72] Inventors Donald E. Anschutz
 Wilbraham, Mass.;
 Lawrence S. Smith, Simsbury, Conn.
[21] Appl. No. 21,261
[22] Filed Mar. 20, 1970
[45] Patented Aug. 3, 1971
[73] Assignee United Aircraft Corporation
 East Hartford, Conn.

[54] ISOCHRONOUS GOVERNING SYSTEM WITH ACCELERATION-DECELERATION LIMITING MEANS
 9 Claims, 4 Drawing Figs.

[52] U.S. Cl. .................................................. 60/39.28
[51] Int. Cl. .................................................. F02c 9/08
[50] Field of Search .......................................... 60/39.28;
 91/458, 366

[56] References Cited
 UNITED STATES PATENTS

| 2,941,602 | 6/1960 | Coar | 60/39.28 X |
| 3,007,448 | 11/1961 | Erikson | 91/458 X |
| 3,023,801 | 3/1962 | Kinney | 137/58 X |
| 3,071,009 | 1/1963 | Stearns | 91/366 X |
| 3,139,894 | 7/1964 | Strebinger | 60/39.28 |
| 3,148,501 | 9/1964 | Olderburger | 91/458 X |
| 3,225,814 | 12/1965 | Capwell | 60/39.28 X |

Primary Examiner—Clarence R. Gordon
Attorney—Norman Friedland

ABSTRACT: A fuel control for a turbine-type power plant is designed to include an isochronous governing system wherein both integrating and proportional valves control servo fluid to the actuator so that the velocity of the actuator is proportional to the flow into and out of it whereby the stroke rate is a function of the error plus the rate of change of the error in combination with means for controlling the acceleration and deceleration of the power plant.

INVENTORS
DONALD E. ANSCHUTZ
LAWRENCE S. SMITH
BY Norman Friedland
ATTORNEY

ISOCHRONOUS GOVERNING SYSTEM WITH ACCELERATION-DECELERATION LIMITING MEANS

CROSS-REFERENCE TO RELATED APPLICATION

This invention relates to and is used in conjunction with the control system disclosed and claimed in an application Ser. No. 21,260 filed by Lawrence S. Smith entitled "Isochronous Governing System Comtrol" filed on even date and assigned to the same assignee.

BACKGROUND OF THE INVENTION

This invention relates to means for obtaining acceleration and deceleration limit schedules for a fuel control for a gas turbine engine. While it is customary to provide acceleration and deceleration schedules for a gas turbine engine, the heretofore known method is to employ a three-dimensional cam and mechanically or hydraulically position the throttle valve as a function of the movement of the cam. Superimposed on the cam surface is a schedule for overtemperature and surge for the acceleration schedule which cam is rotated and translated as a function of compressor inlet temperature and compressor speed. The deceleration schedule customarily would employ a separate cam which is controlled by the power lever and may or may not be biased with other engine parameters. The acceleration and deceleration schedules serve to assure that the engine accelerates in an optimum manner while assuring that the engine does not become overheated and that surge does not occur and decelerates in a manner that rich or lean blowout does not ensue while increasing the life of the engine burner cans.

The heretofore known acceleration/deceleration scheduling mechanism while proven efficacious in droop type governing systems does not lend itself to be employed in an isochronous governing system. To employ the acceleration/deceleration scheduling mechanisms that are heretofore known for droop type governing fuel control systems would require a more complex, less accurate and more expensive mechanisms than are provided for by the invention.

We have found that we can obtain an improved acceleration/deceleration scheduling system by providing an acceleration/deceleration valve normally rendered inoperative during steady state and governing and operative during acceleration/deceleration limiting. In addition, sensed compressor discharge pressure $\sqrt{P_3}$ and fuel flow $\sqrt{W_f}$ are converted to square root functions and are used in the computation of fuel flow acceleration and deceleration limiting. Since the $\sqrt{P_3}$ and the $\sqrt{W_f}$ represent a significantly smaller ratio of the maximum to minimum value than does $P_3$ and $W_f$, smaller load variations on the computation mechanism are realized and hence smaller load variations on the fuel metering valve are obtainable resulting in better control accuracy.

SUMMARY OF INVENTION

The primary object of this invention is to provide in a fuel control for a gas-type power plant which has an isochronous governing system, improved means for achieving acceleration and deceleration scheduling.

In accordance with this invention an acceleration/deceleration valve responsive to engine operating parameters serves to restrict the isochronous governing capabilities to prevent surge, overtemperature, and rich and lean blowouts.

A still further object of this invention is to provide an acceleration/deceleration valve disposed in the actuating flow line between the isochronous governor and the fuel metering means actuator.

A still further object of this invention is to provide mechanism for computing the square root of the parameters sensed which improves the control accuracy and sensitivity inasmuch as it reduces the operative range of the parameters being sensed.

Other features and advantages will be apparent form the specification and claims and from the accompanying drawings which illustrate an embodiment of the invention.

While in its preferred embodiment this invention includes computation mechanism that converts sensed parameters into a square root function, it is to be understood as would be obvious to one ordinarily skilled in the art that the particular type of computation in no way limits the scope of the invention. There are advantages for including the square root computation which will be more fully explained hereinbelow. As was obvious to one ordinarily skilled in the art, the acceleration/deceleration valve to be described hereinbelow may be utilized with other types of computation systems without affecting the scope of this invention.

Figure 1:
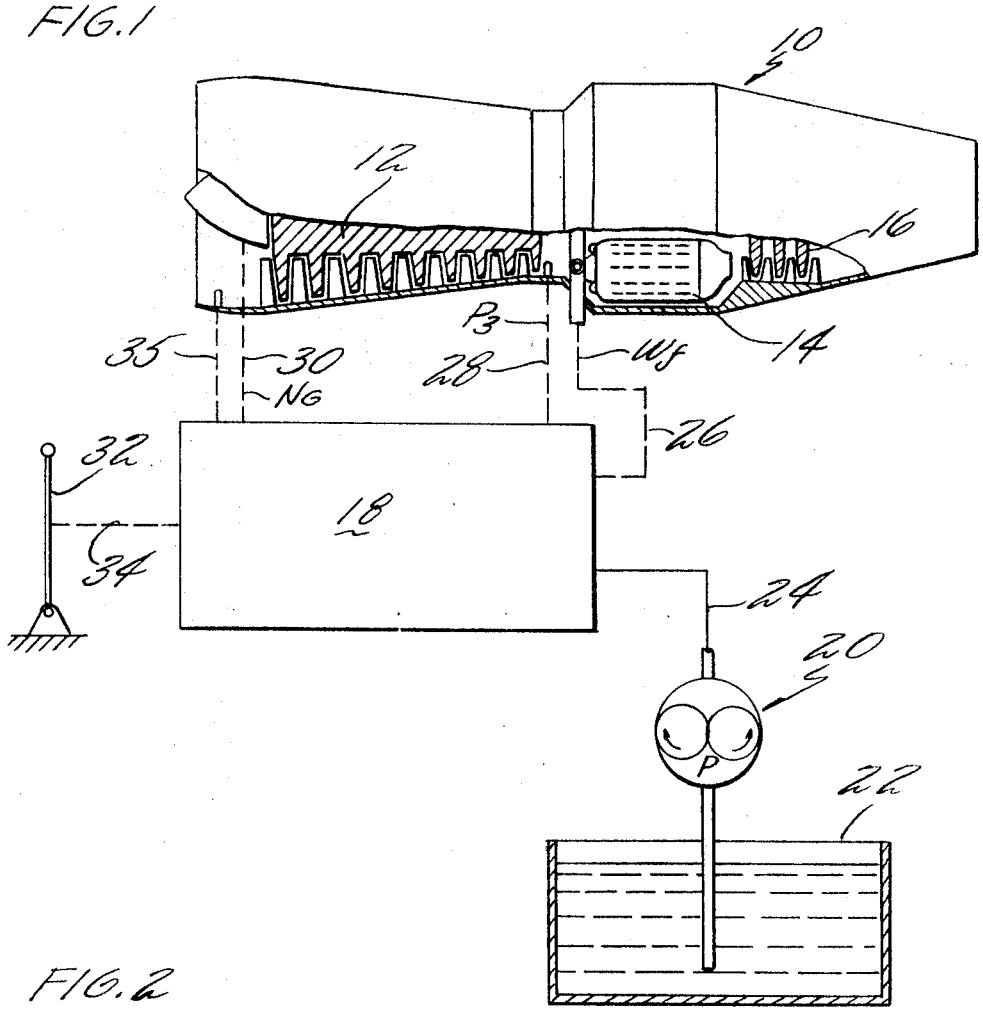
FIG. 1 is a schematic generally illustrating a fuel control for a gas turbine engine.

Referring more particularly to the figures of the drawings, FIG. 1 illustrates schematically a jet engine illustrated by reference numeral 10 comprising a compressor section 12, a burner section 14, and a turbine section 16 wherein the power extracted from the gases emanating from the burner drive the compressor in the customary fashion. Fuel metered to the burner section from fuel control generally illustrated by numeral 18 is controlled in a manner to be described hereinbelow. As is customary, the fuel control receives pressurized fluid from a suitable source such as pump 20 connected to reservoir 22 via line 24 where it meters the proper amount of fuel fed to the burner section via line 26 for optimum engine operation. The computer section of the fuel control senses compressor discharge pressure ($P_3$) via dash line 28, r.p.m. of the compressor or gas generator ($N_g$) via dash line 30, compressor inlet temperature (CIT) via dash line 35 and the position of the power lever 32 via line 34. The computation section of the fuel control, therefore, serves to meter the proper amount of fuel to the engine to meet engine prescribed requirement. The computer of the fuel control exacts the limits to assure safe engine operating conditions.

Figure 2:
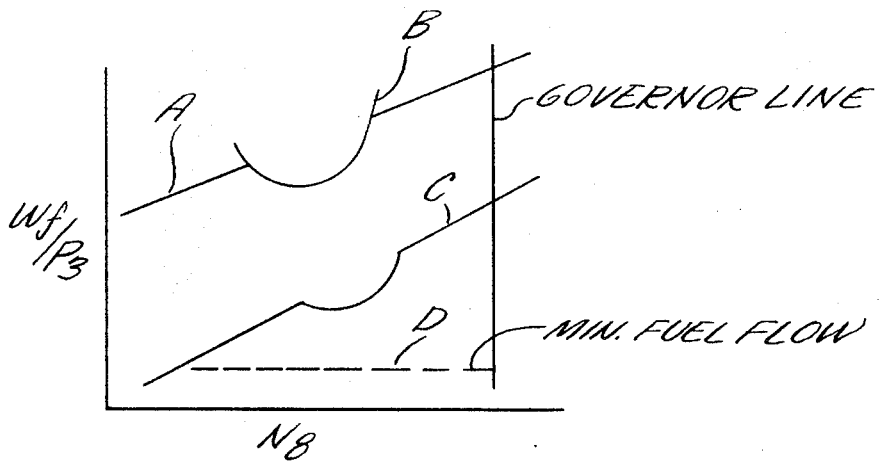
FIG. 2 is a graphical illustration showing the scheduled acceleration/deceleration lines illustrating a typical schedule for the fuel control designed in accordance with the present invention.

As shown in the graph depicted in FIG. 2, curve A defines the overtemperature limit, curve B defines the surge limit and curve C defines the deceleration limit. As is well known in the art, these lines shift with different inlet temperatures accounted for by the computations made by the fuel control controlling mechanism. It will be appreciated that deceleration curve C is similarly shaped to the combined curves A and B for simplification of the deceleration mechanism as will be more fully appreciated from the description hereinbelow. While certain portions of the fuel control are not included in this description, such as the speed sensor, pressure regulator, and various sensing mechanisms, these are well known in the art and are not deemed necessary to describe the invention. However, reference is made to and incorporated hereby to U.S. Pat. No 3,192,988 granted to R. D. Porter and C. F. Stearns, and U.S. Pat. No. 2,822,666 granted to S. G. Best, and to the patent application entitled "Isochronous Governing System Control" filed by Lawrence S. Smith on even date and assigned to the same assignee.

Figure 3:
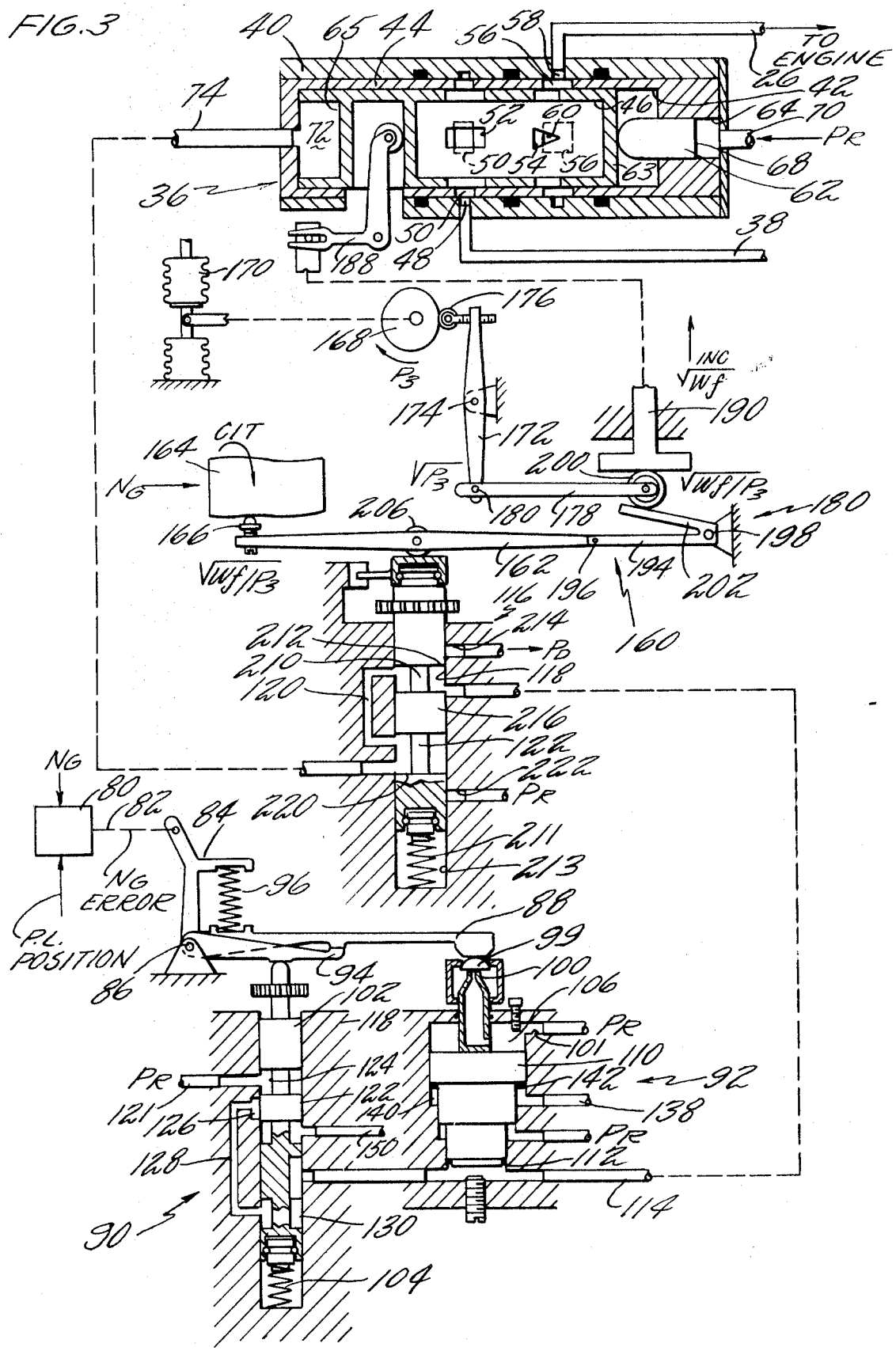
FIG. 3 is a schematic representation, partly in section, of the present invention.

Looking at the details of the invention as depicted in FIG. 3, fuel discharging from the pump is admitted into the throttle valve generally illustrated by numeral 36 via line 38 where it is metered and delivered to the engine via line 26.

Throttle valve 36 comprises housing 40 having a central bore 42 in which is disposed a pair of concentrically mounted sleeves 44 and 46. Sleeve 46 closed at either end is slidable relative to sleeve 44 which is fixed to the bore of housing 40. An annular groove 48 communicating with inlet line 38 is in register with a plurality of circumferentially spaced rectangularly shaped slots 50 formed in sleeve 44. A plurality of circumferentially spaced rectangular slots 52 formed in sleeve 46 complement and are in continuous register with slots 50. Slots 52 extend beyond slots 50 so that there is always unrestricted flow into sleeve 46 at all axial positions thereof. Fuel admitted in the central cavity portion of sleeve 46 is metered through the metering area 60 defined by the triangularly shaped port 54 formed in sleeve 46 and the underlying rectangularly shaped port 56 formed in sleeve 44. The metered fuel, in turn, communicates with the annular groove 58 which connects to the feed line 26.

Therefore, it is apparent that the position of slot 52 relative to the stationary position of port 56 defines the metering area 60 of the fuel metering valve. This particular triangularly shaped port 52 is formed so that the rectilinear motion thereof and/or the area of the metering orifice is a square root function of the displacement of sleeve 46. It also serves to increase governor gain as a function of $W_f$. Since the engine gain varies as a function of altitude, the metering orifice is so shaped so that the governor gain varies in altitude. Thus the governor gain is reduced at a higher altitude and increased at a lower altitude to keep the overall gain at a constant value. Accordingly, throttle valve or metering valve 36 meters flow which varies as the square of the position of the valve, and valve position is an indication of the square root of actual fuel flow. Of course, the pressure drop across the metering area is held constant by any suitable pressure drop regulating means, as for example, the one described in U.S. Pat. No 2,822,666.

Actuation of the metering valve is accomplished by a split half-area servo which comprises piston 62 mounted in a bore 64 formed in the right end of housing 44 acting on end wall 63 of sleeve 46 tending to urge the sleeve leftwardly and metered servo pressure acting on the end wall 65 tending to urge sleeve 46 rightwardly. Regulated pressure is continuously admitted to chamber 68 to act on piston 62 via line 70. Metered pressure is applied into chamber 72 to act on end wall 65 via the servo line 74. Since the area of piston 68 is half the area of end wall 65, sleeve 46 will be in balance when the pressure in chamber 72 equals half the pressure in chamber 68.

As is apparent from the foregoing, movement of throttle valve 36 is accomplished by controlling the pressure in chamber 72 by the computation mechanism which will be described hereinbelow.

As was described in the L. S. Smith Pat. application Ser. No. 21,260 filed on the same date, supra, steady state engine operation is achieved by a closed loop system which adjusts fuel flow as a function of speed error. Shown schematically, the blank box 80 consists of suitable mechanisms that compare actual compressor speed with power lever position (which is indicative of the compressor speed desired) to produce a speed error signal whenever a difference therebetween occurs. Any speed error will result in an output signal illustrated by dash line 82 for rotating a bellcrank 84 about pivot 86. Bellcrank 84 and the attaching pivotable link 88 serve to concomitantly actuate the integrating valve generally indicated by numeral 90 and the proportional valve generally indicated by numeral 92 to obtain isochronous governing. Link 88 and arm 94 are held in contact by spring 96 and separate when link 88 is grounded and integrating valve 90 continues its travel.

Actuation of the bellcrank 84, say in a clockwise direction calling for an increase in compressor speed (i.e. engine power), concomitantly actuates proportional valve 92 by adjusting the flapper 98 relative to the orifice 100 and integration valve 90 by adjusting the spool 102 which is urged in the upward direction by spring 104. Looking at the proportional valve first, it will be noted that flapper valve 98 reduces the curtain area of orifice 100 decreasing the pressure drop across restriction 101, thus, increasing the pressure in chamber 106.

This pressure acting on the upper surface of piston 110 urges it in a downward direction causing a slug of fluid in recess 112 to be forced through line 114 and into acceleration/deceleration valve 116. It will be appreciated that during steady state operation, that is, while the control is on neither the acceleration nor deceleration schedule, acceleration/deceleration valve 116 is rendered inoperative and does not affect the flow of fluid between line 74 and 114. As noted line 114 communicates with chamber 72 via the annular passage 118, the drilled passage 120, and the annular passage 122. This signal urges sleeve 46 rightwardly so that the area of orifice 60 increases with a consequential increase of the flow of fuel to the engine.

Secondly, spool 102 of integrating valve 90 is forced downwardly and moves relative to the cooperating ports in housing 118 so as to communicate pressurized fluid in line 121 with line 114 via the land 122, annular chamber 124, port 126, drilled passage 128 and the annular chamber 130. When the corrected speed is achieved the bellcrank 84 will return to its original position causing the proportional valve 92 and integrating valve 90 to return to their original positions as shown in the drawing.

When bellcrank 84 is rotated counterclockwise, calling for a decrease in compressor speed (i.e. less power), arm 94 lifts off of spool 102 which is urged upwardly by spring 104 forcing link 88 upwardly. This effectively opens the curtain area of orifice 100 so that the pressure drop across restriction 101 is increased reducing the pressure in chamber 106. The pressure in chamber 140 acting on the shoulder 142 of piston 110 urges piston 110 upwardly. It is apparent from the foregoing that piston 106 is a half area servo and that the pressure in chamber 142 equals twice the pressure in chamber 106 when in the balanced position as shown in FIG. 3. Piston 110 moves in the upward direction increasing the volume of recess 112. This volume is then immediately filled by the fluid existing in lines 74 and 114 and obviously permitting the sleeve 46 to translate leftwardly.

Simultaneously land 122 of spool 102 moves upwardly communicating drain passage 150 with port 126, line 128 and annular chamber 130 and eventually through lines 114 and 74 for dumping pressure from chamber 72. It is apparent from the foregoing that speed error mechanism 80, integrating valve 90 and proportional valve 92 serve to hold speed constant at a given power lever setting regardless of changes in load and temperature at the compressor inlet resulting in isochronous governing. This mechanism controls the velocity of sleeve 46 as a function of the flow into and out of chamber 72 obviously making the stroke rate equal to a function of the speed error signal plus the rate of change of said error.

In accordance with this invention the acceleration/deceleration valve 116 is inserted between the actuator for the throttle valve and the isochronous governing system. As mentioned in the above, flow through the acceleration/deceleration valve when the engine is operating at a steady state condition, is undisturbed. Acceleration/deceleration valve 116 is only actuated in order to keep the engine within the confines of curves A, B, and C as shown in the graph of FIG. 2 during acceleration and deceleration of the engine. This is effectuated by computation linkage mechanism generally indicated by numeral 160. Error lever 162 compares the desired acceleration and deceleration schedules by producing a signal equal to a function of compressor inlet temperature and compressor speed which is acquired by rotating and translating three-dimensional cam 164. The operation of the three-dimensional cam and its attendant mechanism is omitted here for the sake of convenience and simplicity and reference should be made to U.S. Pat. Nos. 3,192,988 and 2,822,666, supra. The profile of cam 164 is designed to produce a signal equivalent to the scheduled limiting value of $\sqrt{\dfrac{W_f}{P_3}}$. This signal then is compared with the actual $\sqrt{\dfrac{W_f}{P_3}}$. The actual $\sqrt{\dfrac{W_f}{P_3}}$ is computed in the manner to be immediately described.

Cam 168 is rotated as a function of $P_3$ in any well-known manner as, for example, by the Phd 3 sensor and servo described in U.S. Pat. Nos. 2,822,666 and 3,192,988, supra. Cam 168 is also profiled so as to produce a signal which is indicative of actual $P_3$. This signal is applied to lever 172 which is pivotally supported by pivot 174 thus moving follower 176. Obviously, lever 178 pivotally connected to the end of lever 172 by pivot 180 is a function of $\sqrt{P_3}$. The $\sqrt{W_f}$ signal is divided by $\sqrt{P_3}$ by the dividing linkage mechanism generally illustrated by numeral 180. Since the position of sleeve 46 of metering valve 36 is indicative of $\sqrt{W_f}$ as was described in the above, bellcrank 188 serves to position platan 190 so that its position is likewise a function of $\sqrt{W_f}$. The dividing linkage 180 comprising arm 194 pivotally connected to lever 162 by pivot 196 and pivotally connected at 198 divides $\sqrt{W_f}$ by the $\sqrt{P_3}$ to produce a quotient signal indicative of the actual $\sqrt{\frac{W_f}{P_3}}$. It will be noted that roller 200 is continuously urged against slanting arm 202 and platan 190. Thus the angular position of link 194 is always indicative of actual $\sqrt{\frac{W_f}{P_3}}$ and follower 166 is indicative of scheduled $\sqrt{\frac{W_f}{P_3}}$. Whenever the actual and scheduled $\sqrt{\frac{W_f}{P_3}}$ are matched, no error between the scheduled $\sqrt{\frac{W_f}{P_3}}$ and actual $\sqrt{\frac{W_f}{P_3}}$ signals will be evidenced.

An error signal between the $\sqrt{\frac{W_f}{P_3}}$ scheduled and the actual $\sqrt{\frac{W_f}{P_3}}$ will cause link 162 to move in either the upward or downward direction depending on the polarity of the error signal. An upward movement raises roller 206 to position upwardly spool 210 which is spring loaded by spring 211 secured at the bottom of cavity 213. When spool 210 moves in the upward direction, metering land 212 of spool 210 will uncover line 214 which communicates with drain pressure for dumping fluid from chamber 72 via line 74, annular chamber 122, drilled passage 120 and annular chamber 118. When land 212 opens line 214, land 216 of spool 210 will block off the flow in line 114 for modulating pressure in chamber 72 and consequently controlling area 60 of triangular port 62 for controlling acceleration in accordance with curves A and B of FIG. 2. Since three-dimensional cam 164 is already utilized for this schedule, it also can be utilized to define the deceleration curve which essentially matches the acceleration curve at a lesser value. During deceleration should there be an error existing between the scheduled $\sqrt{\frac{W_f}{P_3}}$ and the actual $\sqrt{\frac{W_f}{P_3}}$, link 162 will be displaced for urging spool 210 in a downward direction. This serves to move land 220 to uncover line 222 which feeds regulated pressure and land 216 to block off drilled passage 120. Regulated pressure then is fed into chamber 72 via annular passage 122 and line 74 for urging sleeve 46 to the right for controlling metering area 60 for defining the deceleration in accordance with schedule C of FIG. 2.

While a deceleration schedule may be employed as described above, it is to be understood that it is equally within the scope of this invention to incorporate a fixed stop for the deceleration schedule so that a minimum fuel flow schedule can be employed. This alternative is shown in FIG. 2 so that when the engine is decelerating, the governor regulates fuel until it intersects dash line D, at which point the acceleration/deceleration valve abuts a suitable stop (not shown) and fuel will follow the minimum $W_f$ line D.

While the acceleration/deceleration valve was described above as being in series with the throttle valve actuator, it is contemplated that the acceleration/deceleration valve can be mounted in parallel relation thereto or mounted upstream of the governor system. Accordingly, as will be obvious to one ordinarily skilled in the art, the particular location of the acceleration/deceleration valve is one of design and convenience and hence its location is not a limitation to the scope of this invention.

Figure 4:
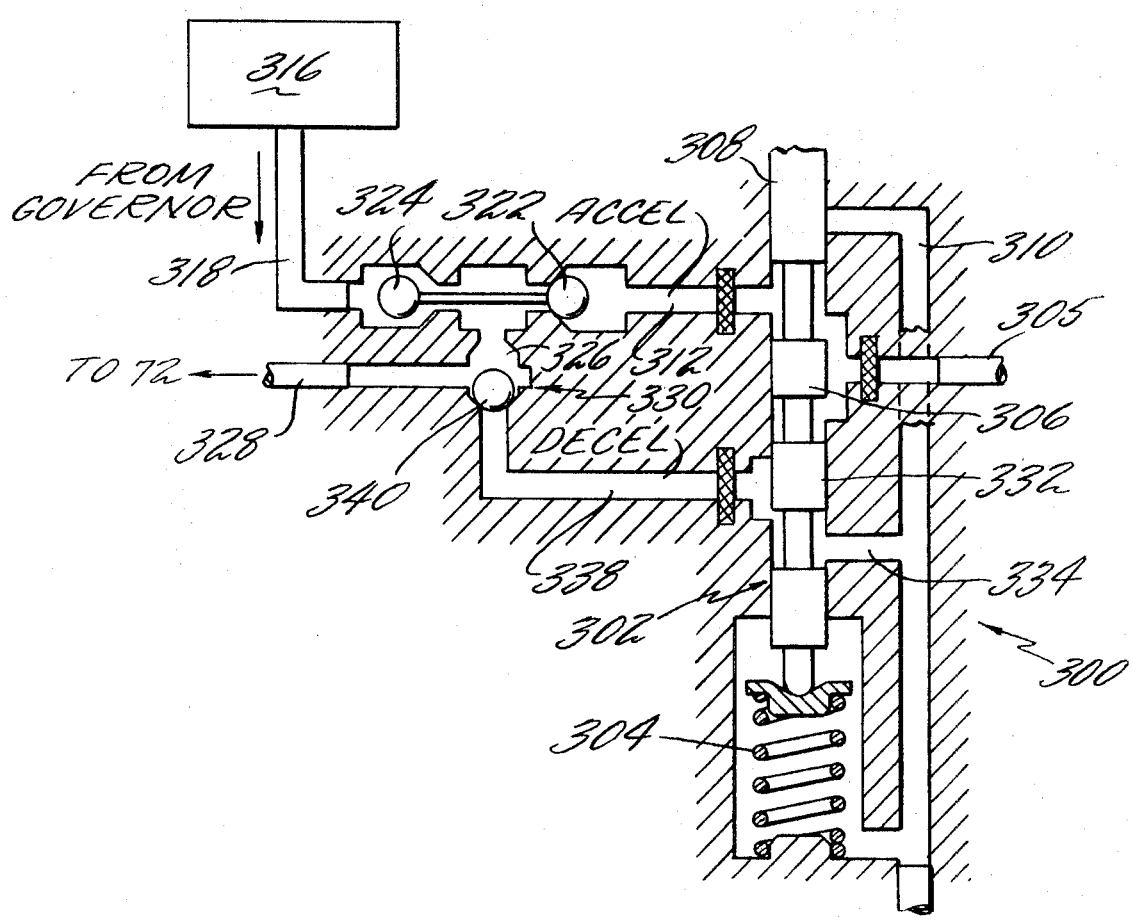
FIG. 4 is a schematic representation, partly in section, illustrating another embodiment of this invention.

This is exemplified by FIG. 4 which shows the acceleration/deceleration valve located in parallel rather than in series. As noted, acceleration/deceleration valve 300 operates substantially like acceleration/deceleration valve 116 of FIG. 3. Spool 302 moves relative to the acceleration/deceleration control linkages (not shown) similarly to spool 122 of FIG. 3 and is biased by spring 304. During acceleration spool 302 moves upwardly so that land 306 blocks flow from the regulated pressure line 305 and land 308 opens to drain line 310. This communicates line 312 with drain.

The selector valve generally indicated by reference numeral 314 senses the pressure from the governor system illustrated by blank box 316 which controls the pressure in line 318. (Line 318 is comparable to line 114 of FIG. 3.) Since pressure behind ball 322 is now less than the pressure behind ball 324, the balls will shift to the right communication line 326 with line 328. (line 328 corresponds to line 74 of FIG. 3) to control the actuator.

From the foregoing it will be apparent that the acceleration signal is compared to the governing signal (steady state) and the least of the pressure values produced will control the actuator.

Likewise the selector generally illustrated by numeral 330 compares the deceleration signal with the governor signal and the lower of the two pressures will control the actuator. Accordingly, when decelerating, spool 302 moves downwardly and land 332 blocks off drain line 334 and communicated regulated pressure in line 305 with line 338. This pressure acting on ball 340 of selector 330 urges it upwardly communicating line 338 with line 328, thus the decelerating schedule now controls the actuator. By allowing spool 302 to hit a fixed stop (not shown) the deceleration schedule can be defined to follow the minimum fuel flow line shown by dash line D of FIG. 2.

It should be understood that the invention is not limited to the particular embodiments shown and described herein, but that various changes and modifications may be made without departing from the spirit or scope of this novel concept as defined by the following claims.

We claim:

1. For a fuel control for a turbine type of power plant having a compressor, burner and turbine receiving the discharge from the burner for driving said compressor, a throttle valve including fuel connection means for regulating the flow of fuel to said burner, said fuel control having isochronous governing means including a source of servo pressure for holding the speed of said compressor at a constant value for a predetermined steady state operating condition, an actuator for controlling the position of said throttle valve, said isochronous governing means including hydraulic valve means for regulating the servo pressure to control said actuator, in combination with control means including valve means to control said servo pressure for controlling the acceleration of said engine, said control means being responsive to engine operating conditions rendering said governing means inoperative during acceleration and regulate said servo pressure during acceleration whereby said valve means operates said actuator.

2. For a fuel control as claimed in claim 1 wherein said engine operating conditions include compressor inlet temperature and compressor speed.

3. For a fuel control as claimed in claim 1 wherein said valve means also controls the deceleration of said engine so that said governing means are rendered inoperative and said valve means regulate said servo pressure.

4. For a fuel control as claimed in claim 1 wherein said throttle valve includes means for obtaining the square root value of said fuel flow, said control means including means responsive to compressor speed and compressor inlet temperature for scheduling a first signal equivalent to the square root of fuel flow divided by compressor discharge pressure, means responsive to actual compressor discharge pressure and means for obtaining said square root value of said fuel flow for producing a second signal indicative of the value of the square root fuel flow divided by compressor discharge pressure and means responsive to said first and second signals for controlling the position of said valve means.

5. For a fuel control as claimed in claim 4 wherein said means responsive to compressor speed and compressor inlet temperature is a three-dimensional cam.

6. For a fuel control as claimed in claim 4 wherein said means for producing a second signal includes sensing means responsive to compressor discharge pressure and dividing linkages connected to said sensing means and said throttle valve.

7. For a fuel control as claimed in claim 1 wherein said valve means includes a spool having a pair of spaced lands, one of said lands operable during acceleration and the other of said lands operable during deceleration.

8. For a fuel control as claimed in claim 1 including selectable means responding to said governing means and said acceleration control means for selecting one or the other of said means for controlling said actuator.

9. For a fuel control as claimed in claim 3 including selectable means responding to said governing means and said acceleration control means for selecting one or the other of said means and additional selectable means responding to said selectable means and said deceleration control means for controlling said actuator.